US011804233B2

(12) United States Patent
Kim et al.

(10) Patent No.: US 11,804,233 B2
(45) Date of Patent: Oct. 31, 2023

(54) LINEARIZATION OF NON-LINEARLY TRANSFORMED SIGNALS

(71) Applicant: QUALCOMM incorporated, San Diego, CA (US)

(72) Inventors: Lae-Hoon Kim, San Diego, CA (US); Dongmei Wang, Bellevue, WA (US); Cheng-Yu Hung, San Diego, CA (US); Erik Visser, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 308 days.

(21) Appl. No.: 16/685,987

(22) Filed: Nov. 15, 2019

(65) Prior Publication Data
US 2021/0151064 A1 May 20, 2021

(51) Int. Cl.
G10L 21/02 (2013.01)
G06T 5/10 (2006.01)
(Continued)

(52) U.S. Cl.
CPC ............... G10L 21/02 (2013.01); G06T 5/10 (2013.01); G06V 10/30 (2022.01); G06V 10/764 (2022.01);
(Continued)

(58) Field of Classification Search
CPC ..... G10L 21/0364; G10L 15/16; G10L 15/22; G10L 21/0232; G10L 25/78;
(Continued)

(56) References Cited

U.S. PATENT DOCUMENTS 5,146,470 A * 9/1992 Fujii .................... H04B 3/23
375/350
5,272,723 A * 12/1993 Kimoto .................. G06N 3/04
375/232
(Continued)

FOREIGN PATENT DOCUMENTS

EP 1052619 A2 * 11/2000 ............. G10L 25/78

OTHER PUBLICATIONS

Cintra R.J., et al., "Low-Complexity Approximate Convolutional Neural Networks," IEEE Transactions on Neural networks and Learning Systems, IEEE, Piscataway, NJ, USA, vol. 29, No. 12, Nov. 16, 2018 (Nov. 16, 2018), pp. 5981-5992, XP011697749, ISSN: 2162-237X, DOI: 10.1109/TNNLS.2018.2815435 [retrieved on Nov. 19, 2018].

(Continued)

Primary Examiner — Bhavesh M Mehta
Assistant Examiner — Edward Tracy, Jr.
(74) Attorney, Agent, or Firm — QUALCOMM Incorporated; Espartaco Diaz Hidalgo

(57) ABSTRACT

A device includes one or more processors configured to perform signal processing including a linear transformation and a non-linear transformation of an input signal to generate a reference target signal. The reference target signal has a linear component associated with the linear transformation and a non-linear component associated with the non-linear transformation. The one or more processors are also configured to perform linear filtering of the input signal by controlling adaptation of the linear filtering to generate an output signal that substantially matches the linear component of the reference target signal.

33 Claims, 9 Drawing Sheets

(51) Int. Cl.
  *G10L 15/16* (2006.01)
  *G10L 15/22* (2006.01)
  *G10L 21/0232* (2013.01)
  *G10L 21/0364* (2013.01)
  *G10L 25/78* (2013.01)
  *G06V 40/16* (2022.01)
  *G06V 10/764* (2022.01)
  *G06V 10/82* (2022.01)
  *G06V 10/30* (2022.01)
  *G10L 21/0208* (2013.01)
  *H04B 1/06* (2006.01)

(52) U.S. Cl.
  CPC .............. *G06V 10/82* (2022.01); *G06V 40/16* (2022.01); *G06V 40/161* (2022.01); *G10L 15/16* (2013.01); *G10L 15/22* (2013.01); *G10L 21/0232* (2013.01); *G10L 21/0364* (2013.01); *G10L 25/78* (2013.01); *G10L 2021/02082* (2013.01); *H04B 1/06* (2013.01)

(58) Field of Classification Search
  CPC .......... G10L 2021/02082; G10L 21/02; G06K 9/00228; G06T 5/10; G06V 10/82; G06V 10/30; G06V 40/161; G06V 40/16; G06V 10/764; H04B 1/06
  See application file for complete search history.

(56) References Cited

U.S. PATENT DOCUMENTS

| | | | | |
|---|---|---|---|---|
| 5,909,466 A * | 6/1999 | Labat | ................ | H04L 25/0305 375/233 |
| 8,385,562 B2 * | 2/2013 | Jeong | ........................ | G01S 5/20 381/92 |
| 8,565,415 B2 * | 10/2013 | Schmidt | ................ | H04M 9/082 379/406.03 |
| 9,936,290 B2 | 4/2018 | Mohammad et al. | | |
| 2001/0033583 A1 | 10/2001 | Rabenko et al. | | |
| 2007/0064816 A1 * | 3/2007 | Chiang | ................ | H04N 19/117 375/240.29 |
| 2007/0177023 A1 * | 8/2007 | Beuhler | ................ | G08B 29/188 348/211.3 |
| 2008/0018506 A1 * | 1/2008 | Raveendran | ......... | H04N 19/176 341/51 |
| 2010/0008520 A1 * | 1/2010 | Saruwatari | .......... | G10L 21/0232 381/94.2 |
| 2010/0274554 A1 * | 10/2010 | Orr | ........................ | G10L 25/78 704/201 |
| 2015/0003606 A1 * | 1/2015 | Nemer | .................. | H04M 3/002 379/406.01 |
| 2015/0215700 A1 | 7/2015 | Sun et al. | | |
| 2017/0150254 A1 | 5/2017 | Bakish | | |
| 2017/0243582 A1 * | 8/2017 | Menezes | ............... | G10L 13/033 |
| 2018/0350379 A1 | 12/2018 | Wung et al. | | |
| 2019/0035382 A1 | 1/2019 | Christoph | | |
| 2019/0115040 A1 | 4/2019 | Kamdar et al. | | |
| 2019/0122685 A1 * | 4/2019 | Defraene | ................. | H04R 3/02 |
| 2019/0222691 A1 | 7/2019 | Shah et al. | | |
| 2020/0186103 A1 * | 6/2020 | Weber | ................... | H03F 1/3252 |
| 2021/0020189 A1 * | 1/2021 | Jukic | ..................... | G10L 15/063 |

OTHER PUBLICATIONS

International Search Report and Written Opinion—PCT/US2020/060635—ISA/EPO—dated May 11, 2021, pp. 1-24.
Partial International Search Report—PCT/US2020/060635—ISA/EPO—dated Feb. 10, 2021, pp. 1-14.

* cited by examiner

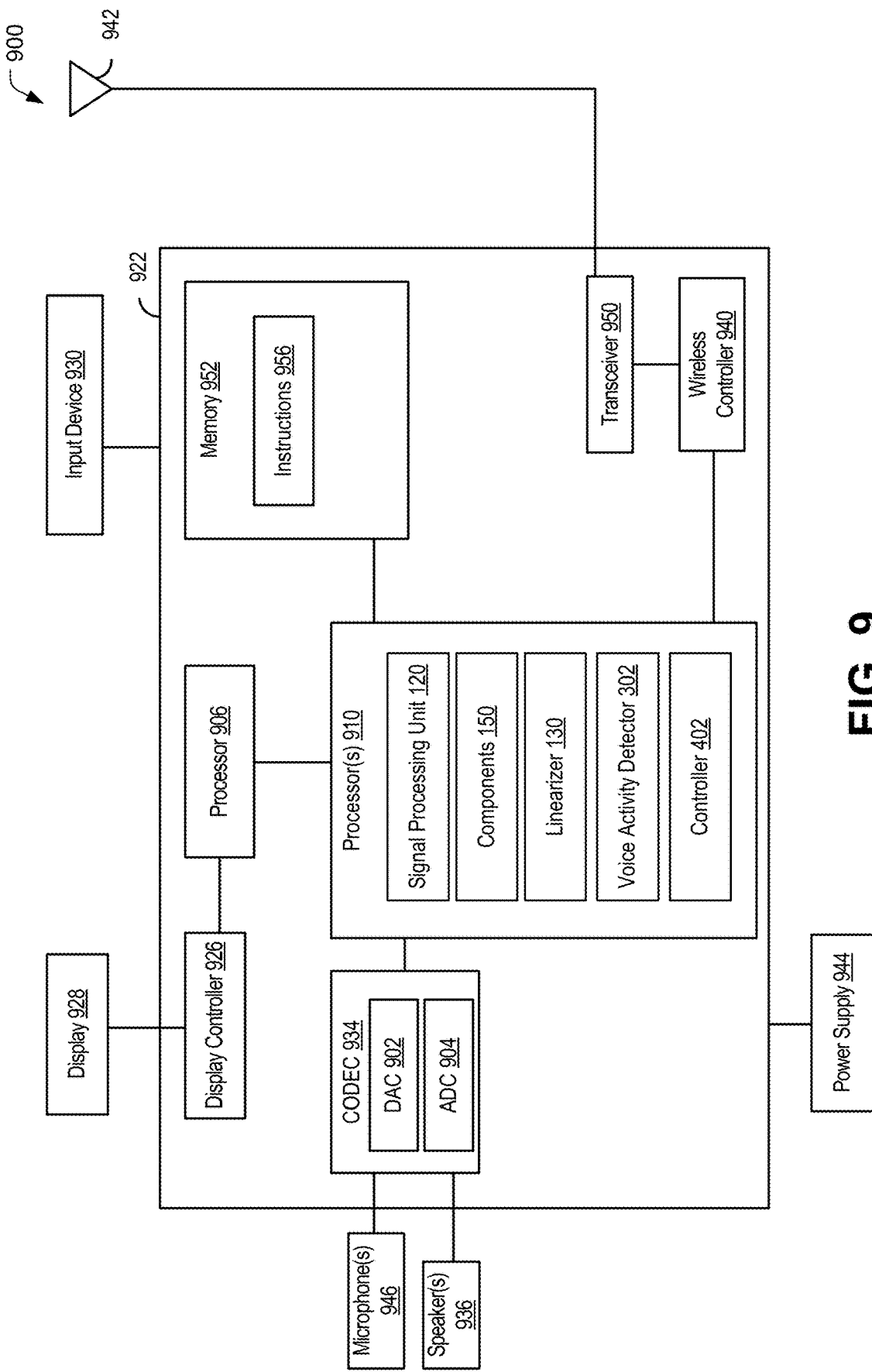

LINEARIZATION OF NON-LINEARLY TRANSFORMED SIGNALS

I. FIELD

The present disclosure is generally related to signal processing.

II. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

A computing device can perform transformations of input signals for signal enhancement, such as to enhance speech and suppress noise in an input audio signal. For example, the computing device can perform transformations of the input signals that result in enhanced signals that can be characterized as including linear components indicative of a linear transformation of the input signals and non-linear components indicative of a non-linear transformation of the input signals. The enhanced signals are effective for some implementations, such as a speech-enhanced audio signal that is played via a speaker to a human during a phone call. However, such enhanced signals often result in reduced performance in speech recognition or voice verification/authentication implementations.

III. SUMMARY

In a particular aspect, a device to perform signal processing includes one or more processors configured to perform signal processing including a linear transformation and a non-linear transformation of an input signal to generate a reference target signal. The reference target signal has a linear component associated with the linear transformation and a non-linear component associated with the non-linear transformation. The one or more processors are also configured to perform linear filtering of the input signal by controlling adaptation of the linear filtering to generate an output signal that substantially matches the linear component of the reference target signal.

In another particular aspect, a method of signal processing includes performing signal processing including a linear transformation and a non-linear transformation of an input signal to generate a reference target signal. The reference target signal has a linear component associated with the linear transformation and a non-linear component associated with the non-linear transformation. The method also includes performing linear filtering of the input signal by controlling adaptation of the linear filtering to generate an output signal that substantially matches the linear component of the reference target signal.

In another particular aspect, a computer-readable storage device stores instructions that, when executed by one or more processors, cause the one or more processors to perform signal processing including a linear transformation and a non-linear transformation of an input signal to generate a reference target signal. The reference target signal has a linear component associated with the linear transformation and a non-linear component associated with the non-linear transformation. The instructions also cause the one or more processors to perform linear filtering of the input signal by controlling adaptation of the linear filtering to generate an output signal that substantially matches the linear component of the reference target signal.

In another particular aspect, an apparatus includes means for performing signal processing including a linear transformation and a non-linear transformation of an input signal to generate a reference target signal. The reference target signal has a linear component associated with the linear transformation and a non-linear component associated with the non-linear transformation. The apparatus also includes means for performing linear filtering of the input signal by controlling adaptation of the linear filtering to generate an output signal that substantially matches the linear component of the reference target signal.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

Figure 8A:
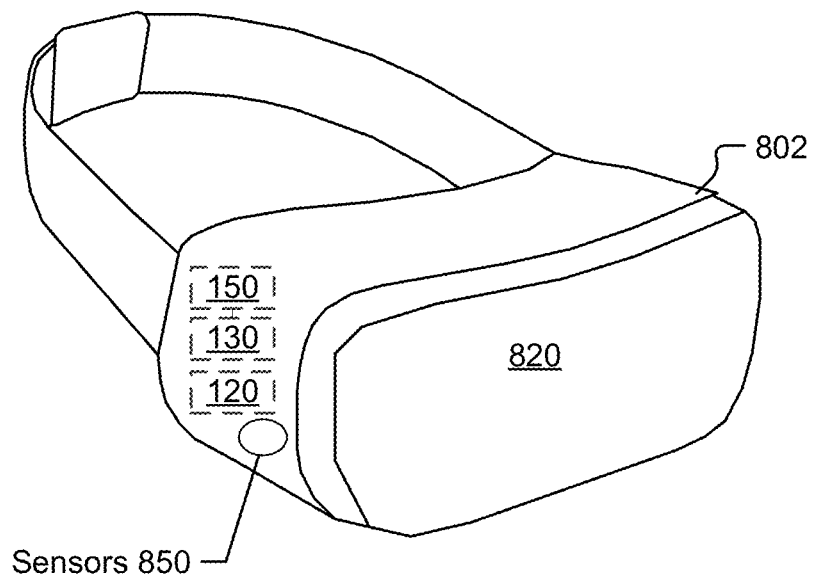
FIG. 8A is a diagram of a virtual reality or augmented reality headset operable to perform linearization of non-linearly transformed signals, in accordance with some examples of the present disclosure.
Figure 8B:
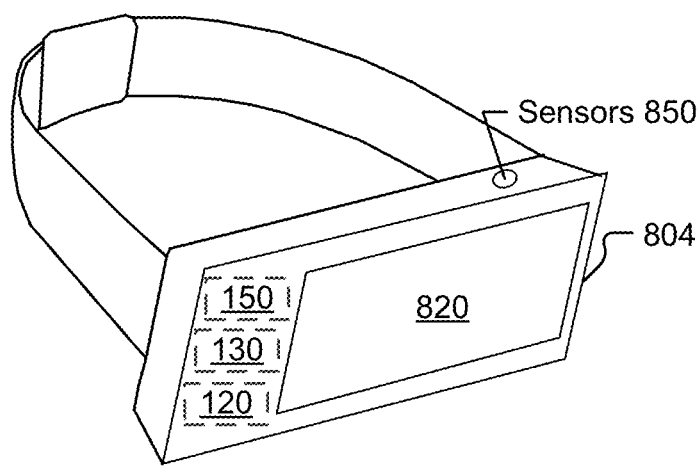

FIG. 8B is a diagram of a wearable electronic device operable to perform linearization of non-linearly transformed signals, in accordance with some examples of the present disclosure; and FIG. 9 is a block diagram of a particular illustrative example of a device that is operable to perform linearization of a non-linearly transformed input signal, in accordance with some examples of the present disclosure.

V. DETAILED DESCRIPTION

Systems and methods of performing linearization of a non-linearly transformed input signal are disclosed. A computing device includes a signal processing unit that performs signal enhancements, e.g., speech enhancement, audio enhancement, noise suppression, image enhancement, or a combination thereof. Conventionally enhanced signals that include non-linear components are effective for some implementations, such as a speech-enhanced audio signal that is played via a speaker to a human during a phone call. However, such conventional enhanced signals often result in reduced performance in speech recognition or voice verification/authentication implementations.

In accordance with various aspects of the disclosed systems and methods, the signal processing unit performs linear transformations and non-linear transformations of input signals (e.g., speech signals, audio signals, visual signals, data signals, etc.), resulting in enhanced signals that include linear components resulting from one or more linear transformations and non-linear components resulting from one or more non-linear transformations. A linearizer performs linear filtering of the input signals by controlling adaptation of the linear filtering to generate output signals that substantially match the linear components of the enhanced signals. The output signals are provided to signal processing components, such as speech recognition or voice verification components. Processing the output signals (as compared to the enhanced signals) improves accuracy of the signal processing components as compared to conventionally enhanced signals because the output signals substantially match the linear components of the enhanced signals and exclude the non-linear components of the enhanced signals.

Figure 1:
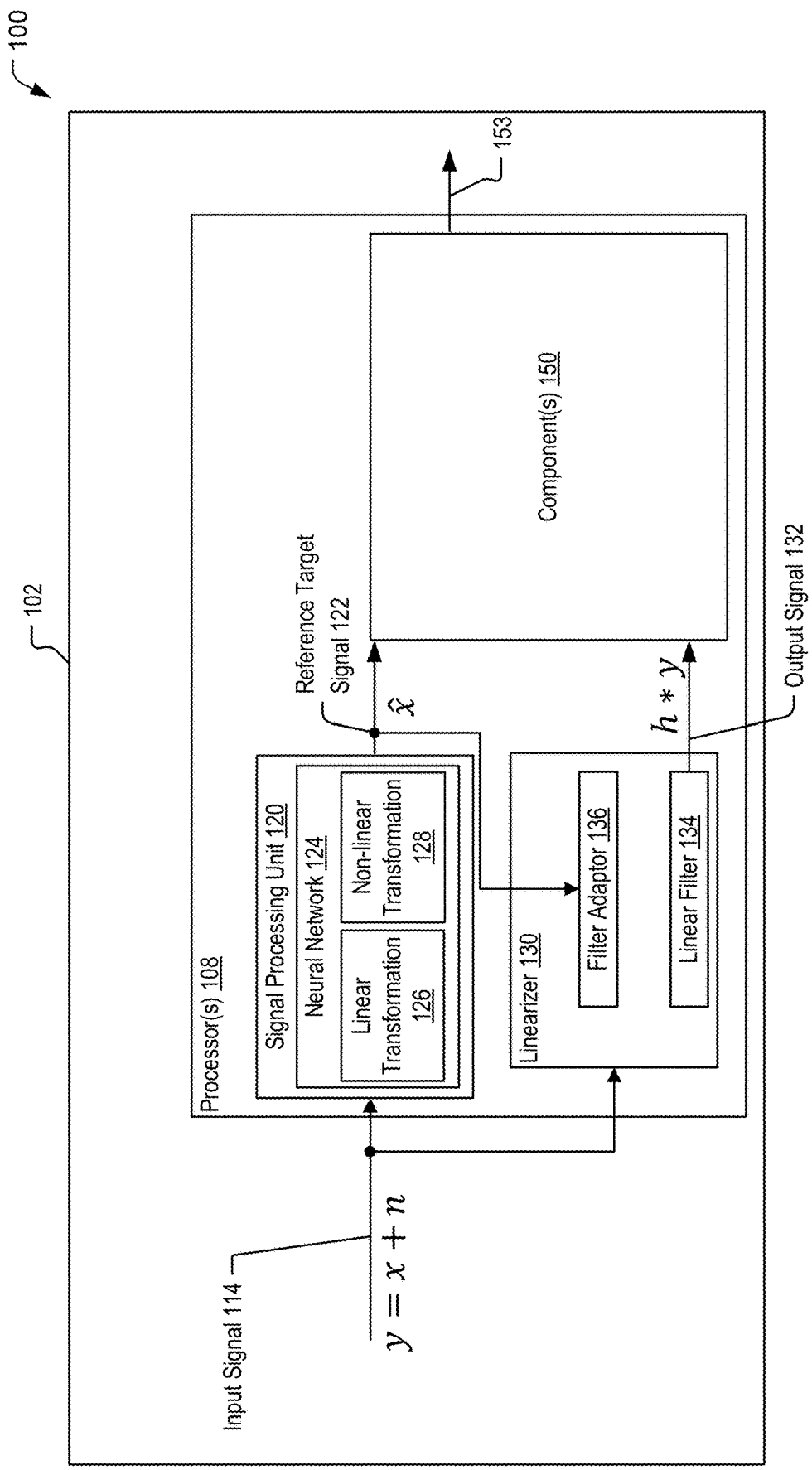
FIG. 1 is a block diagram of a particular illustrative aspect of a system operable to perform linearization of non-linearly transformed signals, in accordance with some examples of the present disclosure.

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. Further, some features described herein are singular in some implementations and plural in other implementations. To illustrate, FIG. 1 depicts a device 102 including one or more processors ("processor(s)" 108 in FIG. 1), which indicates that in some implementations the device 102 includes a single processor 108 and in other implementations the device 102 includes multiple processors 108. For ease of reference herein, such features are generally introduced as "one or more" features, and are subsequently referred to in the singular unless aspects related to multiple of the features are being described.

It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc. As used herein, "directly coupled" may include two devices that are coupled (e.g., communicatively coupled, electrically coupled, or physically coupled) without intervening components.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

Referring to FIG. 1, a particular illustrative aspect of a system operable to perform linearization of a non-linearly transformed signal is disclosed and generally designated 100. The system 100 includes a device 102 that includes one or more processors 108. The processor 108 includes a signal processing unit 120 coupled to a linearizer 130. The signal processing unit 120, the linearizer 130, or both, are coupled to one or more components 150. The signal processing unit 120 is configured to perform signal enhancement of an input signal 114 ("y"). For example, the signal processing unit 120 is configured to perform signal processing of the input signal 114 ("y") to generate a reference target signal 122 ("x̂"). In the example illustrated in FIG. 1, the signal processing unit 120 includes a neural network 124, and the signal processing unit 120 is configured to use the neural network 124 to perform the signal processing of the input signal 114 ("y") to generate the reference target signal 122 ("x̂"). It should be understood that using the neural network 124 to perform the signal processing is provided as an illustrative example. In some implementations, the signal processing unit 120 is configured to perform the signal processing independently of any neural network.

The linearizer 130 includes a linear filter 134 and a filter adaptor 136. The linear filter 134 is configured to perform linear filtering of the input signal 114 ("y") to generate an output signal 132 ("h*y", where "h" is the filter response of the linear filter 134 and "*" indicates convolution). The filter adaptor 136 is configured to, responsive to the reference target signal 122, control adaptation of the linear filtering. For example, the filter adaptor 136 attempts to control adaptation of the linear filtering to make the output signal 132 match the reference target signal 122 as closely as possible. As a result of applying linear filtering (and omitting non-linear filtering), the output signal 132 substantially matches the linear component of the reference target signal 122 and substantially omits the non-linear component of the reference target signal 122. In a particular aspect, processing performed by the system 100 (e.g., the signal processing unit 120, the linearizer 130, or both) can occur in the time-domain, in a transform-domain (e.g., a frequency-domain), or a combination thereof. For example, the signal processing unit 120, the linearizer 130, or both, can process a time-domain signal (e.g., the input signal 114) received from a microphone or a camera. In another example, the processor 108 can include a first fast fourier transform (FFT) module (not shown) configured to apply a transform to the time-domain signal to generate a transform-domain signal and the signal processing unit 120, the linearizer 130, or both, can process the transform-domain signal. The processor 108 can include a second FFT module configured to apply an inverse transform to the reference target signal 122, the output signal 132, or both, prior to further processing by one or more of the components 150. For example, a first component of the components 150 can receive the output signal 132 in the transform-domain and a second component of the components 150 can receive the output signal 132 in the time-domain.

During operation, the processor 108 receives (e.g., accesses) an input signal 114 ("y"). The input signal 114 ("y") includes a portion-of-interest ("x") and a noise portion ("n"). In a particular example, the input signal 114 ("y") includes an audio signal and the component 150 includes a speech processing component. In this example, the portion-of-interest ("x") includes a speech portion and the noise portion ("n") includes audio noise, as further described with reference to FIG. 2. The signal processing unit 120 performs signal processing of the input signal 114 ("y") to generate a reference target signal 122 ("x̂"). In a particular example, the signal processing unit 120 uses the neural network 124 to perform the signal processing of the input signal 114 ("y") to generate the reference target signal 122 ("x̂"). The reference target signal 122 ("x̂") corresponds to a signal enhancement of the input signal 114 ("y") and may be generated by enhancing the portion-of-interest ("x"), reducing the noise portion ("n"), or a combination thereof.

The signal processing includes a linear transformation 126 and a non-linear transformation 128 that result in the signal enhancement. The reference target signal 122 ("x̂") has a linear component associated with (e.g., resulting from) the linear transformation 126 and a non-linear component associated with (e.g., resulting from) the non-linear transformation 128. Although the linear transformation 126 and the non-linear transformation 128 are depicted as separate components, the signal processing unit 120 may generate linear and non-linear components of the reference target signal 122 ("x̂") without separately performing the linear transformation 126 and the non-linear transformation 128. For example, the neural network 124 can process the input signal 114 ("y") to generate the reference target signal 122 ("x̂") by performing an operation in which linear transformations and non-linear transformations are not clearly distinguishable. In a particular example, the reference target signal 122 ("x̂") corresponds to the portion-of-interest ("x") and a distortion portion (e.g., "x̂=x+f(x)", where "f(x)" corresponds to the distortion portion).

The linearizer 130 receives the reference target signal 122 ("x̂") from the signal processing unit 120. The linearizer 130, responsive to the reference target signal 122 ("x̂"), generates an output signal 132 ("h*y") that substantially matches the linear component of the reference target signal 122 ("x̂"). For example, the linear filter 134 performs linear filtering of the input signal 114 ("y") to generate the output signal 132 ("h*y"). The filter adaptor 136, responsive to the reference target signal 122, controls adaptation of the linear filtering (performed by the linear filter 134) so that the output signal 132 substantially matches the linear component of the reference target signal 122. For example, the filter adaptor 136 may select or update a set of filter values of the linear filter 134 to reduce or minimize a difference between the output signal 132 ("h*y") and the reference target signal 122 ("x̂"), such as the L2 norm $\|\hat{x}-h*y\|^2$, the L1 norm $|\hat{x}-h*y|$, another difference metric, or a combination thereof. In a particular aspect, because "h" is the filter response of the linear filter 134, reducing or minimizing the difference between the output signal 132 ("h*y") and the reference target signal 122 ("x̂") results in the output signal 132 corresponding to the linear component of the reference target signal 122 ("x̂").

In a particular aspect, the component 150 is configured to process the output signal 132 ("h*y") to generate an output 153 corresponding to the input signal 114. Examples of the component 150 are described with reference to FIG. 2 and FIG. 5. The component 150 can achieve more accurate results by processing the output signal 132 ("h*y") as compared to processing the reference target signal 122 ("x̂") due to the output signal 132 corresponding to the linear component of the reference target signal 122 and excluding non-linear components of the reference target signal 122. The system 100 thus improves signal processing by the component 150 by providing the linear component of a non-linearly transformed signal (e.g., the reference target signal 122) to the component 150. The system 100 enables the component 150 to take advantage of the signal enhancement performed by the signal processing unit 120 while maintaining accuracy by processing the linear component of the enhanced signal.

Figure 2:
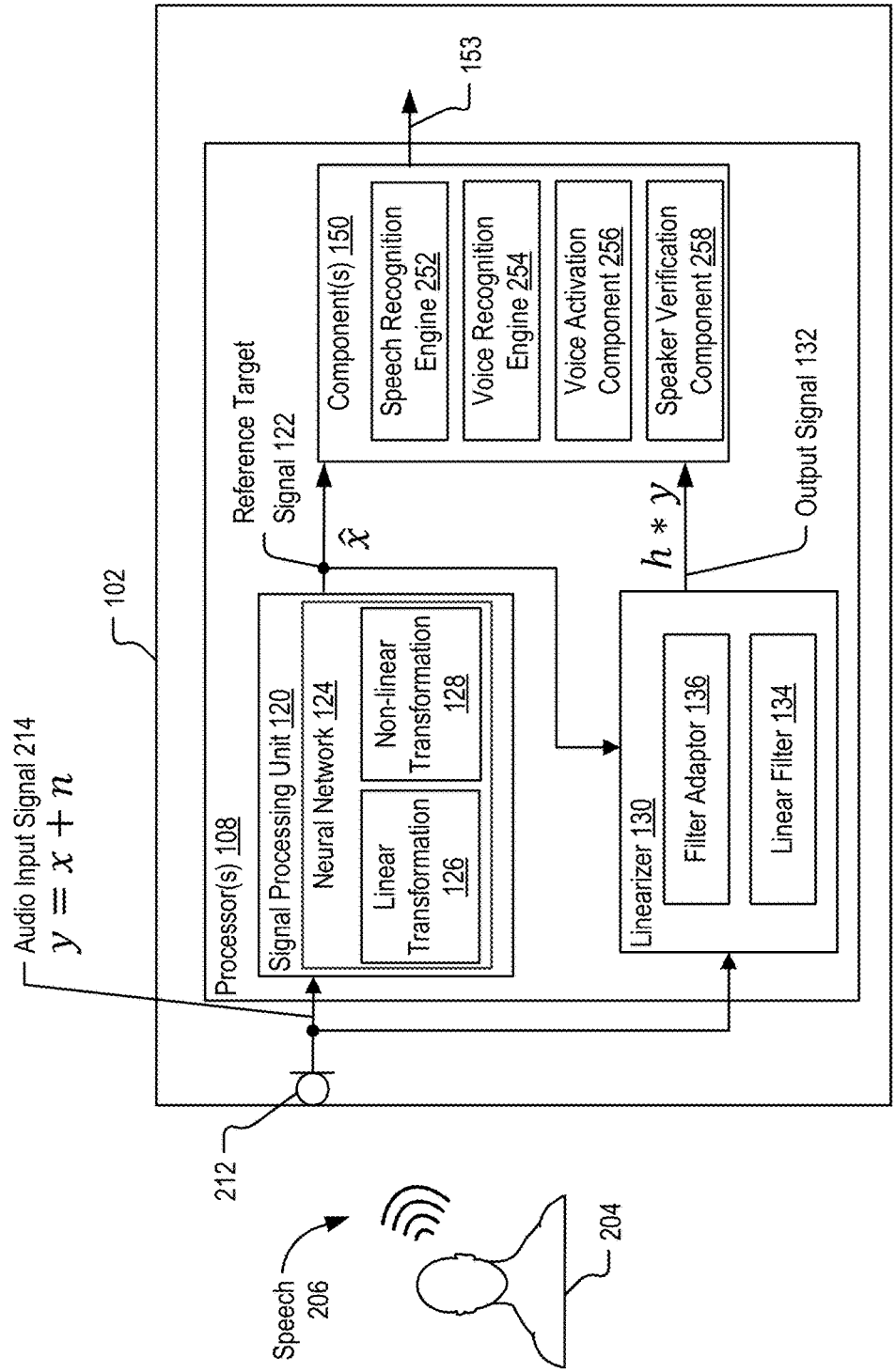
FIG. 2 is a diagram of an illustrative example of a system operable to perform linearization of a non-linearly transformed audio signal, in accordance with some examples of the present disclosure.

Referring to FIG. 2, a particular illustrative aspect of a system operable to perform linearization of a non-linearly transformed audio signal is disclosed and generally designated 200. In a particular aspect, the system 100 includes one or more components of the system 200.

The device 102 includes one or more microphones 212. The microphone 212 receives input sound including speech 206 from a user 204 and noise (e.g., background noise). The microphone 212 generates an audio input signal 214 ("y") that includes a speech portion ("x") and a noise portion ("n"). In a particular aspect, the audio input signal 214 corresponds to the input signal 114 ("y") of FIG. 1.

The signal processing unit 120 performs signal processing of the audio input signal 214 ("y") to generate a reference target signal 122 ("x̂"). In a particular aspect, performing the signal processing at the signal processing unit 120 results in audio signal enhancement, such as echo cancelling, noise suppressing, dereverberating, or a combination. In a particular aspect, the linear transformation 126 and the non-linear transformation 128 result in speech enhancement. The linear filter 134 performs linear filtering of the audio input signal 214 ("y"), such as finite impulse response (FIR) filtering, to generate an output signal 132 ("h*y").

The component 150 includes one or more audio signal processing components, such as a speech recognition engine 252, a voice recognition engine 254, a voice activation component 256, a speaker verification component 258, or a combination thereof. In a particular example, the speech recognition engine 252 processes the output signal 132 to generate an output 153. To illustrate, the output 153 includes a speech recognition output, such as a text output corresponding to speech detected in the output signal 132. In a particular aspect, the output 153 is a more accurate representation of the speech 206 (as compared to a speech recognition output that could be generated from the reference target signal 122) because the output signal 132 includes (e.g., substantially matches) the linear component of the reference target signal 122 and excludes (e.g., substantially omits) the non-linear component of the reference target signal 122. In a particular aspect, the speech recognition engine 252 provides the output 153 to a display device that displays the output 153. For example, in some implementations, the device 102 includes the display device.

In a particular example, the voice recognition engine 254 processes the output signal 132 to generate an output 153. To illustrate, the output 153 includes a voice recognition output, such as a user identifier corresponding to a determination that speech detected in the output signal 132 matches speech of a user associated with the user identifier. In a particular aspect, the output 153 is a more accurate identification of a user corresponding to the speech 206 (as compared to a user that would be identified from detecting speech in the reference target signal 122) because the output signal 132 includes (e.g., substantially matches) the linear component of the reference target signal 122 and excludes (e.g., substantially omits) the non-linear component of the reference target signal 122.

In a particular example, the voice activation component 256 processes the output signal 132 to generate an output 153. To illustrate, the output 153 corresponds to an activation instruction (e.g., car engine activation instruction) corresponding to the voice command (e.g., "start car") detected in the output signal 132. In a particular aspect, the output 153 is a more accurate activation instruction corresponding to the voice command in the speech 206 (as compared to an activation instruction that would be generated from detecting a voice command in the reference target signal 122) because the output signal 132 includes (e.g., substantially matches) the linear component of the reference target signal 122 and excludes (e.g., substantially omits) the non-linear component of the reference target signal 122.

In a particular example, the speaker verification component 258 processes the output signal 132 to generate an output 153. To illustrate, the output 153 includes a speaker verification output, such as an indicator of whether speech detected in the output signal 132 matches speech of a particular authorized user. In a particular aspect, the output 153 is a more accurate indication of whether the speech 206 corresponds to the particular authorized user (as compared to an indication that would be generated from detecting speech in the reference target signal 122) because the output signal 132 includes (e.g., substantially matches) the linear component of the reference target signal 122 and excludes (e.g., substantially omits) the non-linear component of the reference target signal 122.

Although a single linearizer 130 is depicted, in some implementations, the processor 108 includes multiple linearizers 130 corresponding to multiple microphones 212. The signal processing unit 120 generates multiple reference target signals 122, such as one reference target signal 122 for each active microphone 212. In an example, each linearizer 130 operates in parallel with other linearizers 130 and performs linear filtering of a particular audio input signal 214 from a particular microphone 212 based on a particular reference target signal 122 corresponding to the particular audio input signal 214. In this aspect, multiple output signals 132 from the multiple linearizers 130 are provided to the component 150.

It should be understood that the signal processing unit 120 performing speech enhancement is provided as an illustrative example. In other examples, the signal processing unit 120 performs other types of audio signal enhancement, such as noise suppression. To illustrate, the audio input signal 214 ("y") includes a portion-of-interest ("x") and a noise portion ("n"). In some example, the portion-of-interest ("x") corresponds to speech. In other examples, the portion-of-interest ("x") corresponds to other types of audio (e.g., audio tone). The system 200 thus improves accuracy of processing audio signals by audio signal processing components while taking advantage of the audio enhancement performed by the signal processing unit 120.

Figure 3:
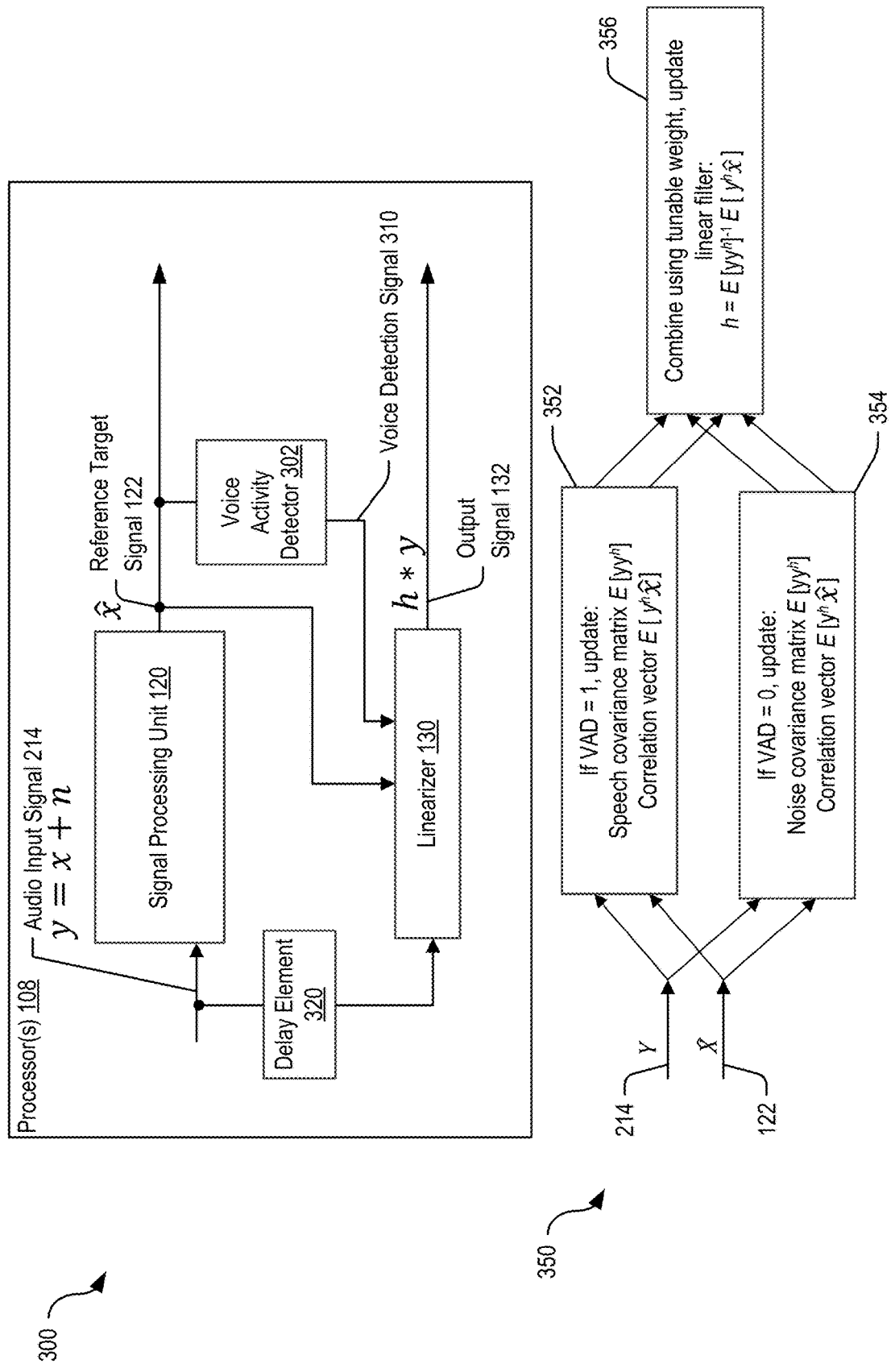
FIG. 3 is a diagram of illustrative examples of components of a device operable to perform linearization of non-linearly transformed audio signals, in accordance with some examples of the present disclosure.

Referring to FIG. 3, an example of components of the system 100 of FIG. 1, the system 200 of FIG. 2, or both, is shown and generally designated 300. In the example 300, the processor 108 includes a voice activity detector (VAD) 302 coupled to the signal processing unit 120 and the linearizer 130. The VAD 302 performs voice activity detection on successive frames of the reference target signal 122 and generates a voice detection signal 310 that indicates to the linearizer 130 whether each corresponding frame of the audio input signal 214 has voice content. A delay element 320 synchronizes processing at the VAD 302 and the linearizer 130, so that the frame of the reference target signal 122 processed to generate the voice detection signal 310 corresponds to the frame of the audio input signal 214 that is processed by the linearizer 130.

FIG. 3 also depicts an example 350 of operations that can be performed by the linearizer 130 based on the voice detection signal 310. If the voice detection signal 310 indicates that voice activity is detected (e.g., VAD=1), a speech covariance matrix (e.g., $E[yy^h]$) and a correlation vector (e.g., $E[y^h \hat{x}]$) for voice frames are updated, at 352. If voice activity is not detected (e.g., VAD=0), a noise covariance matrix (e.g., $E[yy^h]$) and a correlation vector (e.g., $E[y^h \hat{x}]$) for non-voice frames are updated, at 354. The speech covariance matrix and the noise covariance matrix are combined, using one or more tunable weighting factors, to generate a combined covariance matrix. The voice correlation vector and the non-voice correlation vector are also combined, using one or more tunable weighting factors, to generate a combined correlation vector.

In a particular example, the combined covariance matrix (e.g., $E[yy^h]$) corresponds to a weighted sum of the speech covariance matrix (e.g., $E[yy^h]$) and the noise covariance matrix (e.g., $E[yy^h]$). In a particular aspect, the weights applied to the speech covariance matrix (e.g., $E[yy^h]$) and the noise covariance matrix (e.g., $E[yy^h]$) to determine the combined covariance matrix (e.g., $E[yy^h]$) are based on a default value, a configuration value, a user input, or a combination thereof.

In a particular example, the combined correlation vector (e.g., $E[y^h \hat{x}]$) corresponds to a weighted sum of the correlation vector (e.g., $E[y^h \hat{x}]$) for voice frames and the correlation vector (e.g., $E[y^h \hat{x}]$) for non-voice frames. In a particular aspect, the weights applied to the correlation vector (e.g., $E[y^h \hat{x}]$) for voice frames and the correlation vector (e.g., $E[y^h \hat{x}]$) for non-voice frames to determine the combined correlation vector (e.g., $E[y^h\hat{x}]$) are based on a default value, a configuration value, a user input, or a combination thereof.

The linear filter 134 is updated using the combined covariance matrix and the combined correlation vector (e.g., $h=E[yy^h]^{-1}E[y^h\hat{x}]$), at 356. Thus, the adaptation of the linear filtering is controlled at least partially based on whether voice activity is detected in the reference target signal 122.

Figure 4:
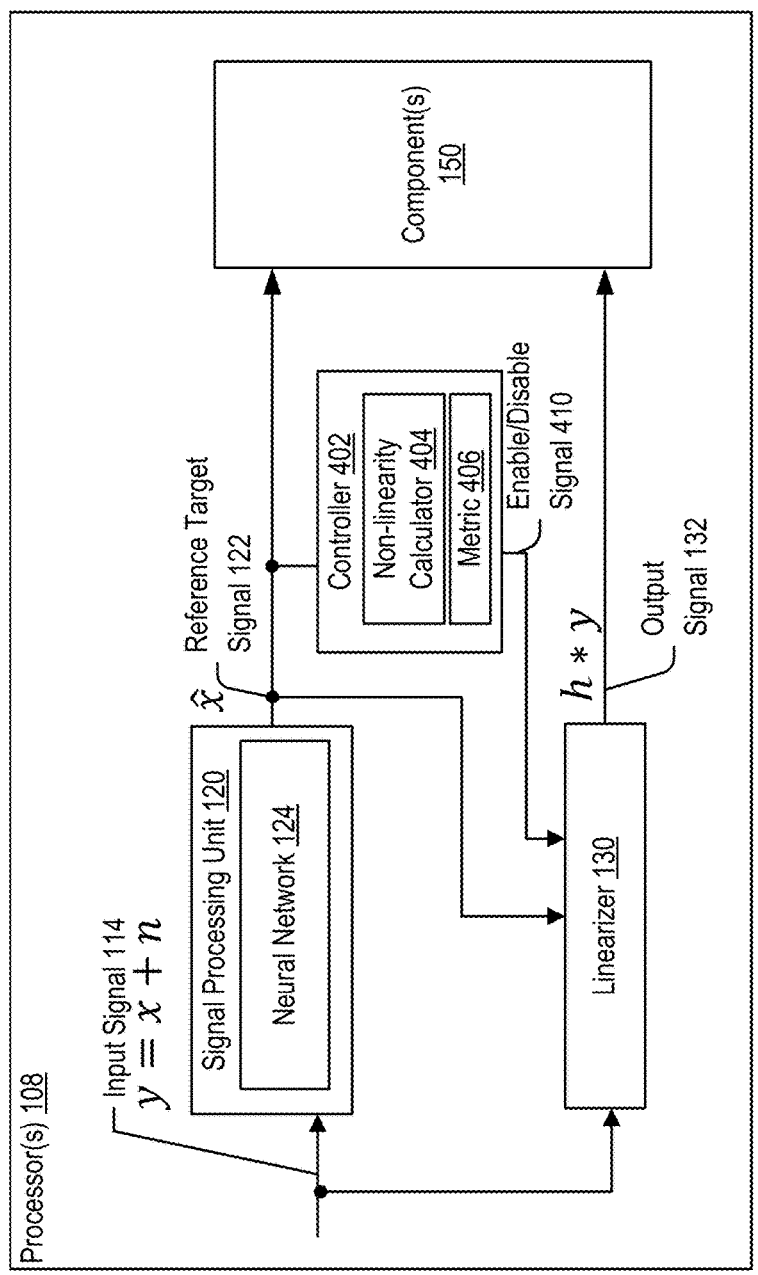
FIG. 4 is a diagram of illustrative examples of components of a device operable to perform linearization of non-linearly transformed signals, in accordance with some examples of the present disclosure.

Referring to FIG. 4, an illustrative example of a system operable to perform linearization of non-linearly transformed signals is shown and generally depicted 400. In a particular example, the system 100 of FIG. 1 includes one or more components of the system 400.

The processor 108 includes a controller 402 coupled to the signal processing unit 120 and the linearizer 130. The controller 402 is configured to selectively disable the linearizer 130 based on a non-linearity metric 406 associated with the reference target signal 122 ("$\hat{x}$"). The component 150 operates using the output signal 132 ("h*y") when the linearizer 130 is enabled and using the reference target signal 122 ("$\hat{x}$") when the linearizer 130 is disabled.

The controller 402 includes a non-linearity calculator 404 that processes the reference target signal 122 ("$\hat{x}$") to generate the non-linearity metric 406 (e.g., kurtosis) indicating an amount of non-linearity of the reference target signal 122 ("$\hat{x}$"). When the non-linearity metric 406 indicates that the amount of non-linearity exceeds a threshold, the controller 402 enables operation of the linearizer 130 via an enable/disable signal 410. Otherwise, the controller 402 disables operation of the linearizer 130 via the enable/disable signal 410.

The threshold can be set to balance performance loss of the components 150 due to non-linearity of the reference target signal 122 ("$\hat{x}$") against the benefits of reduced power consumption and reduced processing resource usage resulting from disabling the linearizer 130. Disabling operation of the linearizer 130 reduces power consumption and processing resource usage of the device 102.

Figure 5:
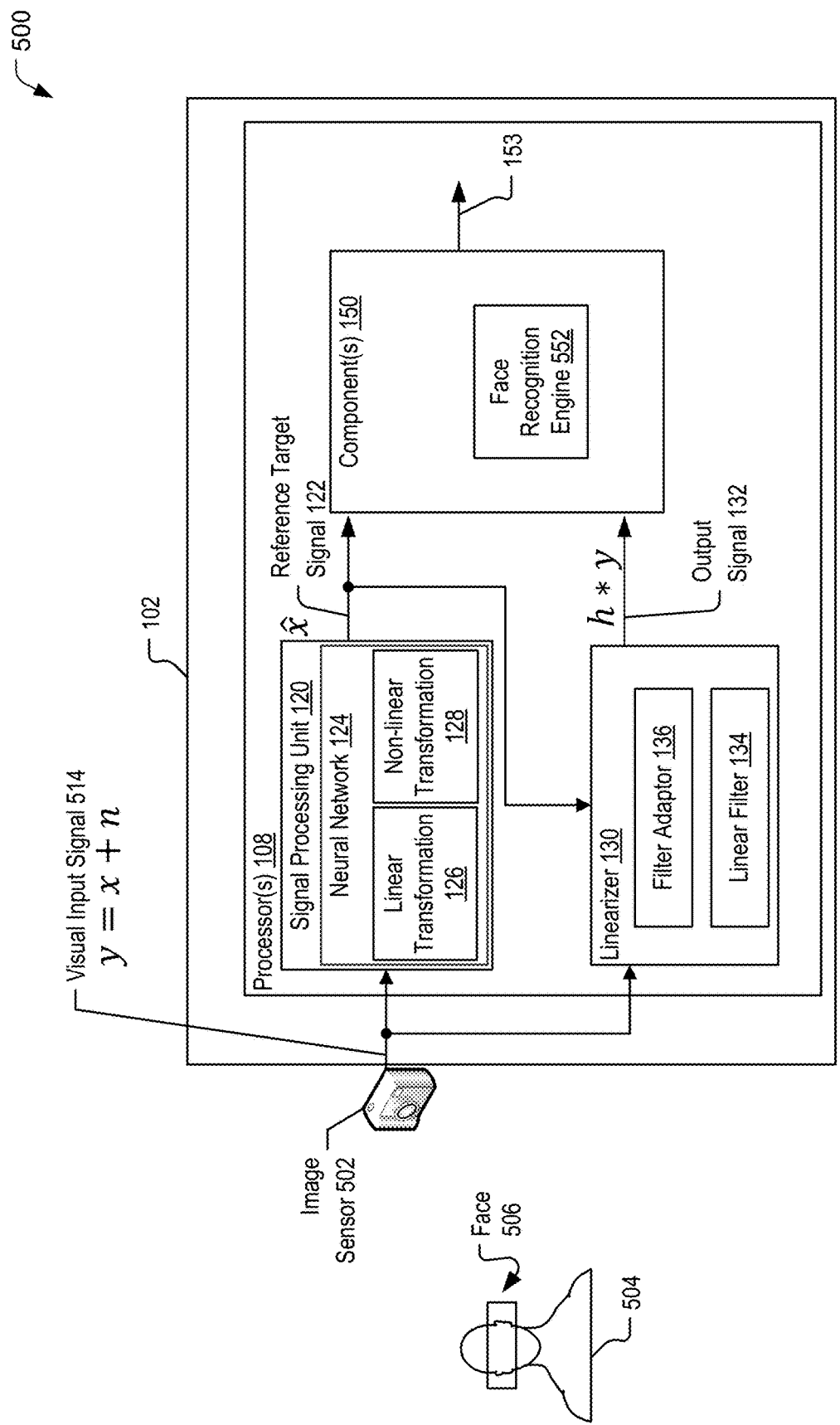
FIG. 5 is a diagram of an illustrative example of a system operable to perform linearization of a non-linearly transformed visual input signal, in accordance with some examples of the present disclosure.

Referring to FIG. 5, a particular illustrative aspect of a system operable to perform linearization of a non-linearly transformed visual input signal is disclosed and generally designated 500. In a particular aspect, the system 100 includes one or more components of the system 500.

The device 102 is coupled to, or includes, one or more image sensors 502. In a particular aspect, the image sensor 502 includes a camera, an infra-red sensor, a radar sensor, a night vision sensor, a video camera, a thermal imaging sensor, a sonar sensor, a digital imaging sensor, a medical imaging sensor, or a combination thereof. The image sensor 502 receives an input image of a face 506 of a user 504 and noise (e.g., non-face regions and also "noise" in the input image). The image sensor 502 generates a visual input signal 514 ("y") that includes a face portion ("x") and a noise portion ("n"). In a particular aspect, the visual input signal 514 corresponds to the input signal 114 ("y") of FIG. 1.

The signal processing unit 120 performs signal processing of the visual input signal 514 ("y") to generate a reference target signal 122 ("$\hat{x}$"). In a particular aspect, performing the signal processing results in visual signal enhancement, such as image noise suppression. In a particular aspect, the linear transformation 126 and the non-linear transformation 128 result in facial image enhancement. The signal processing unit 120 performing facial image enhancement is provided as an illustrative example. In other examples, the signal processing unit 120 can perform other types of visual enhancement. The linear filter 134 performs linear filtering of the visual input signal 514 ("y") to generate an output signal 132 ("h*y") that substantially matches the linear component of the reference target signal 122 ("$\hat{x}$") and substantially omits the non-linear component (e.g., image noise) of the reference target signal 122 ("$\hat{x}$").

The component 150 includes one or more visual signal processing components, such as a face recognition engine 552. In a particular example, the face recognition engine 552 processes the output signal 132 to generate an output 153. To illustrate, the output 153 includes a facial recognition output corresponding to one or more faces represented by the output signal 132. In a particular example, the facial recognition output includes an authorized user indicator. In a particular aspect, the output 153 is a more accurate indicator of whether the face 506 is associated with an authorized user (as compared to a facial recognition output that could be generated from the reference target signal 122) because the output signal 132 includes (e.g., substantially matches) the linear component of the reference target signal 122 and excludes (e.g., substantially omits) the non-linear component of the reference target signal 122. The face recognition engine 552 processing the output signal 132 is provided as an illustrative example. In other implementations, the output signal 132 is processed by other types of visual processing components. The system 500 thus improves accuracy of processing visual signals by visual signal processing components while taking advantage of the visual enhancement performed by the signal processing unit 120. It should be understood that audio signal processing and visual signal processing are provided as illustrative examples. In other examples, various types of data signals can be processed by the system 100 to improve accuracy of various types of components 150.

Note that although the example 300 of FIG. 3 includes a VAD 302 and a delay element 320, and the system 400 of FIG. 4 includes a controller 402, analogous components of the VAD 302, the delay element 320, and the controller 402 can be incorporated in other implementations. For example, the system 500 can include the controller 402 and a face detection module. The processor 108 receiving a single input signal 114 of FIG. 1 is provided as an illustrative example. In other examples, the processor 108 can receive multiple input signals 114. To illustrate, the processor 108 receives multiple input signals 114 from multiple image sensors, multiple microphones, or a combination thereof. In a particular aspect, the processor 108 processes the multiple input signals 114 in parallel to generate multiple output signals 132, as described with reference to FIG. 2. For example, the signal processing unit 120 generates multiple reference target signals 122 corresponding to the multiple input signals 114. A first linearizer 130 generates a first output signal 132 by processing a first reference target signal 122 concurrently with a second linearizer 130 generating a second output signal 132 by processing a second reference target signal 122.

Figure 6:
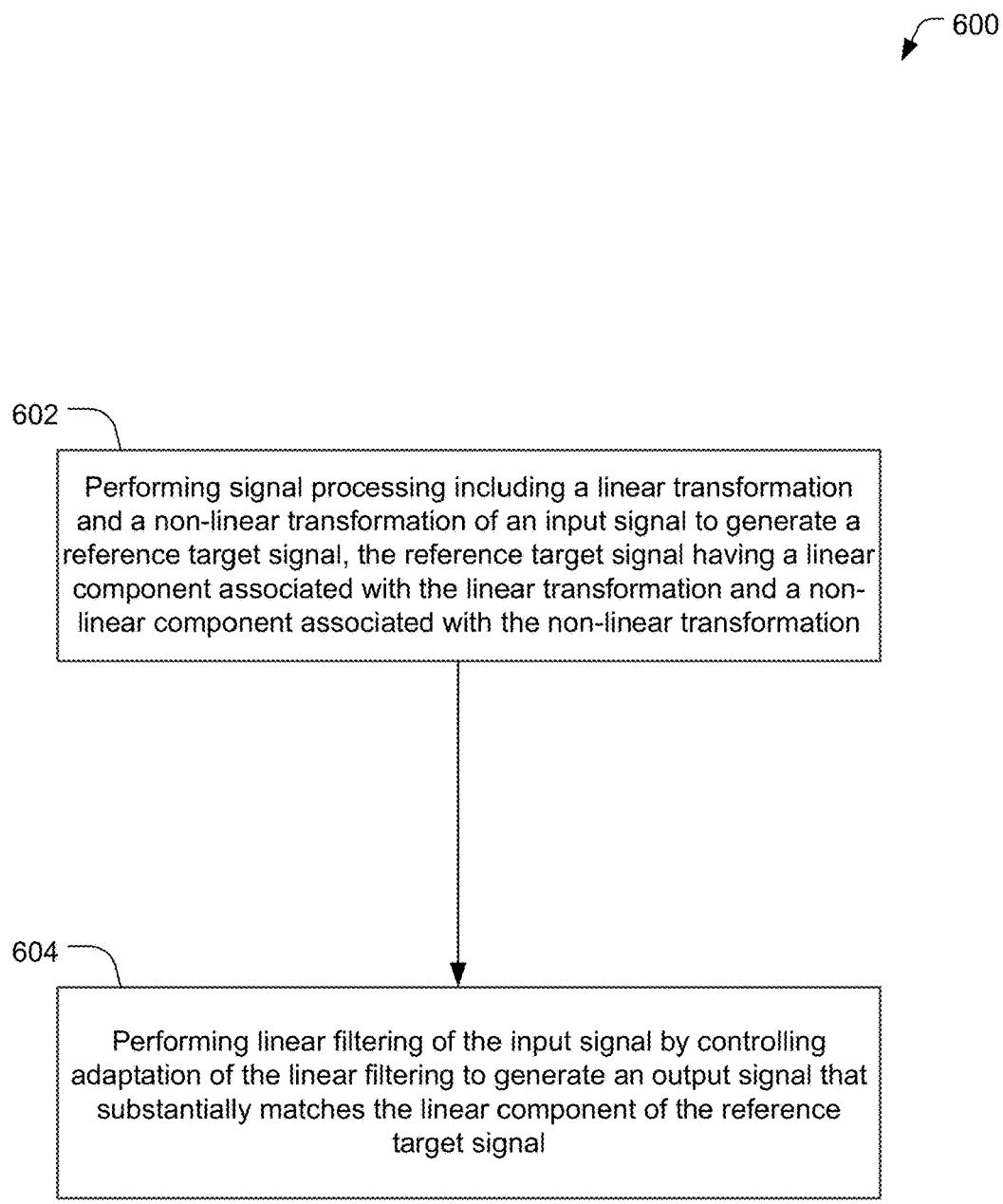
FIG. 6 is a flow chart illustrating a method of performing linearization of a non-linearly transformed input signal, in accordance with some examples of the present disclosure.

In FIG. 6, a method of performing linearization of non-linearly transformed input signals is shown and generally designated 600. In a particular aspect, one or more operations of the method 600 are performed by the neural network 124, the signal processing unit 120, the linear filter 134, the filter adaptor 136, the linearizer 130, the processor 108, the device 102, the system 100 of FIG. 1, the system 200 of FIG. 2, one or more components of the example 300 of FIG. 3, the system 400 of FIG. 4, the system 500 of FIG. 5, or a combination thereof.

The method 600 includes performing signal processing including a linear transformation and a non-linear transformation of an input signal to generate a reference target signal, at 602. For example, the signal processing unit 120 of FIG. 1 performs signal processing including the linear transformation 126 and the non-linear transformation 128 of the input signal 114 ("y") to generate the reference target signal 122 ("x̂"), as described with reference to FIG. 1. The reference target signal 122 ("x̂") has a linear component associated with the linear transformation 126 and a non-linear component associated with the non-linear transformation 128. In a particular aspect, the signal processing corresponds to signal enhancement. As an example, the input signal 114 ("y") includes an audio signal, and the signal processing corresponds to speech enhancement. As another example, the input signal 114 ("y") includes an audio signal, and the signal processing corresponds to noise suppressing, echo cancelling, dereverberating, or a combination thereof. In a particular example, the input signal 114 ("y") includes a visual input signal, and the signal processing corresponds to visual enhancement. In a particular aspect, the method 600 includes using a neural network to perform the signal processing. For example, the signal processing unit 120 of FIG. 1 uses the neural network 124 to perform the signal processing.

The method 600 also includes performing linear filtering of the input signal by controlling adaptation of the linear filtering to generate an output signal that substantially matches the linear component of the reference target signal, at 604. For example, the linear filter 134 of FIG. 1 performs linear filtering of the input signal 114 ("y") by controlling adaptation of the linear filtering to generate the output signal 132 that substantially matches the linear component of the reference target signal 122 ("x̂"), as described with reference to FIG. 1. In a particular aspect, the linear filtering is selectively performed based on a non-linearity metric 406 associated with the reference target signal 122 ("x̂"), as described with reference to FIG. 4. In a particular aspect, the method 600 includes performing voice activity detection of the reference target signal. For example, the VAD 302 of FIG. 3 performs voice activity detection of the reference target signal ("x̂"), as described with reference to FIG. 3. The linearizer 130 controls the adaptation of the linear filtering at least partially based on whether voice activity is detected, as described with reference to FIG. 3.

In a particular aspect, the method 600 includes processing the output signal to generate a text output corresponding to speech in an audio input signal. For example, the speech recognition engine 252 of FIG. 2 processes the output signal 132 to generate an output 153 (e.g., text output) corresponding to the speech 206 in the audio input signal 214 ("y"), as described with reference to FIG. 2. The input signal 114 ("y") includes the audio input signal 214 ("y") and the signal processing corresponds to speech enhancement.

In a particular aspect, the method 600 includes processing the output signal to generate a facial recognition output corresponding to one or more faces represented by a visual input signal. For example, the face recognition engine 552 of FIG. 5 processes the output signal 132 to generate an output 153 (e.g., a facial recognition output) corresponding to the face 506 represented by the visual input signal 514 ("y"). The input signal 114 ("y") includes the visual input signal 514 ("y"), and the signal processing corresponds to facial image enhancement.

The method 600 thus enables generation of the output signal 132 that corresponds to the linear component of the reference target signal 122 and excludes (e.g., substantially omits) non-linear components of the reference target signal 122. The method 600 enables improved signal processing by the component 150 of FIG. 1 that takes advantage of the signal enhancement performed by the signal processing unit 120 while maintaining accuracy by processing the output signal 132 corresponding to the linear component of the enhanced signal.

Figure 7:
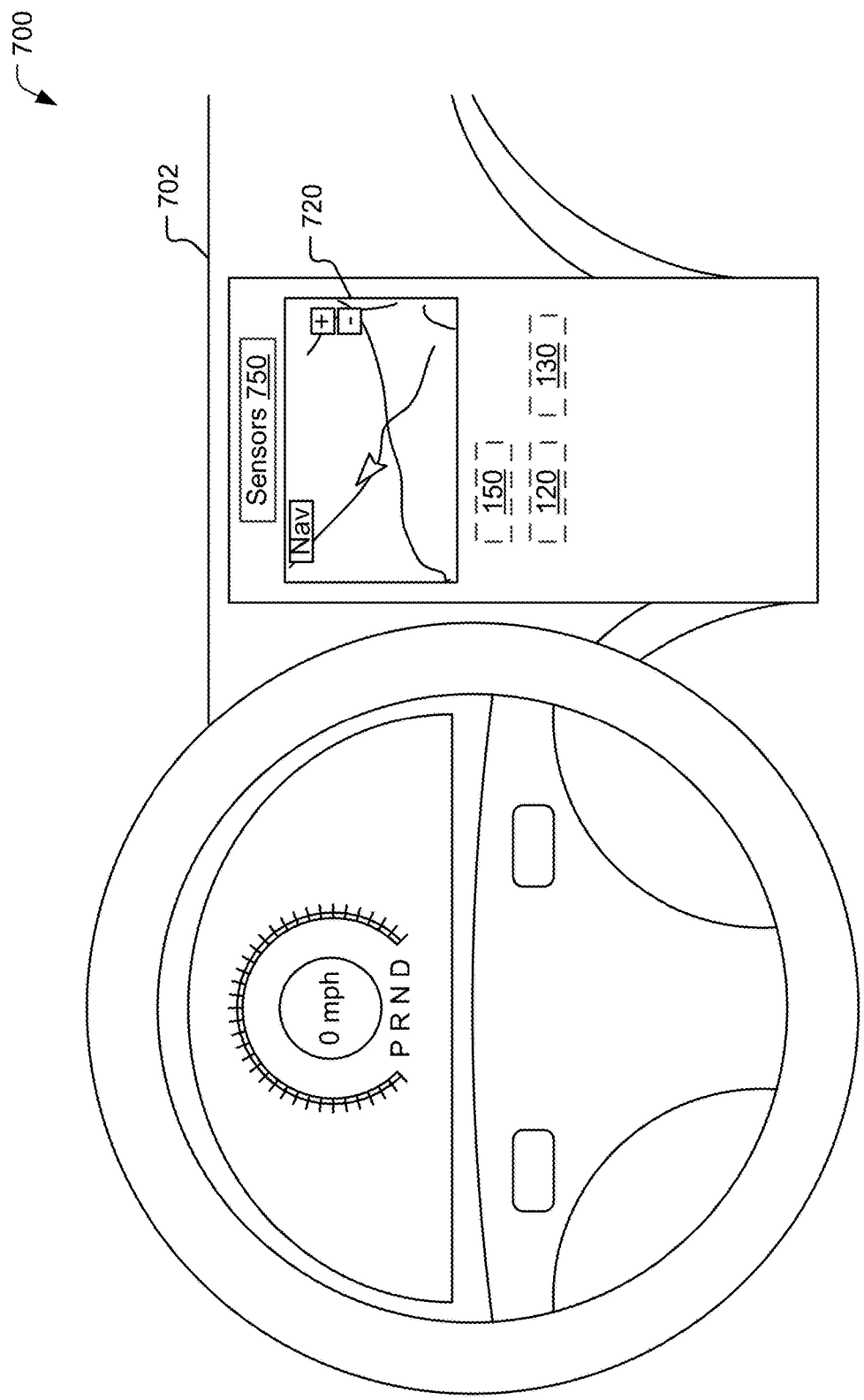
FIG. 7 is a diagram of a vehicle operable to perform linearization of non-linearly transformed signals, in accordance with some examples of the present disclosure.

FIG. 7 depicts an example of an implementation 700 of the device 102 of FIG. 1 integrated into a vehicle dashboard device, such as a car dashboard device 702. Multiple sensors 750 can include one or more microphones, cameras, or other sensors, and can include the microphone 212 of FIG. 2, the image sensor 502 of FIG. 5, or a combination thereof. Although illustrated in a single location, in other implementations one or more of the sensors 750 can be positioned at other locations of the vehicle, such as distributed at various locations within a cabin of the vehicle, such as an array of one or more microphones and one or more cameras located proximate to each seat in the vehicle to detect multi-modal inputs from a vehicle operator and from each passenger.

A visual interface device, such as a display 720 is mounted or positioned (e.g., removably fastened to a vehicle handset mount) within the car dashboard device 702 to be visible to a driver of the car. In a particular example, the display 720 is configured to display the output 153 of FIG. 1. The signal processing unit 120, the linearizer 130, and the component 150 are illustrated with dashed borders to indicate that the signal processing unit 120, the linearizer 130, and the component 150 are not visible to occupants of the vehicle. The signal processing unit 120, the linearizer 130, and the component 150 may be implemented in a device that also includes the display 720 and the sensors 750 or may be separate from and coupled to the display 720 and the sensors 750.

FIG. 8A depicts an example of the signal processing unit 120, the linearizer 130, and the component 150 integrated into a headset 802, such as a virtual reality, augmented reality, or mixed reality headset. A visual interface device, such as a display 820 is positioned in front of the user's eyes to enable display of augmented reality or virtual reality images or scenes to the user while the headset 802 is worn. In a particular example, the display 820 is configured to display the output 153 of FIG. 1. Sensors 850 can include one or more microphones, cameras, or other sensors, and can include the microphone 212 of FIG. 2, the image sensor 502 of FIG. 5, or a combination thereof. Although illustrated in a single location, in other implementations one or more of the sensors 850 can be positioned at other locations of the headset 802, such as an array of one or more microphones and one or more cameras distributed around the headset 802 to detect multi-modal inputs.

FIG. 8B depicts an example of the signal processing unit 120, the linearizer 130, and the component 150 integrated into a wearable electronic device 804, illustrated as a "smart watch," that includes the display 820 and the sensors 850. The sensors 850 enable detection, for example, of user input based on modalities such as video, speech, and gesture.

Referring to FIG. 9, a block diagram of a particular illustrative implementation of a device is depicted and generally designated 900. In various implementations, the device 900 may have more or fewer components than illustrated in FIG. 9. In an illustrative implementation, the device 900 may correspond to the device 102 of FIG. 1. In an illustrative implementation, the device 900 may perform one or more operations described with reference to FIGS. 1-8B.

In a particular implementation, the device 900 includes a processor 906 (e.g., a central processing unit (CPU)). The device 900 may include one or more additional processors 910 (e.g., one or more DSPs). The processor 910 may include the signal processing unit 120, one or more of the components 150, the linearizer 130, the voice activity detector 302, the controller 402, or a combination thereof. In a particular aspect, the processor 108 of FIG. 1 corresponds to the processor 906, the processor 910, or a combination thereof.

The device 900 may include a memory 952 and a CODEC 934. The memory 952 may include instructions 956 that are executable by the one or more additional processors 910 (or the processor 906) to implement one or more operations described with reference to FIGS. 1-8B. In an example, the memory 952 includes a computer-readable storage device that stores the instructions 956. The instructions 956, when executed by one or more processors (e.g., the processor 108, the processor 906, or the processor 910, as illustrative examples), cause the one or more processors to perform signal processing including a linear transformation and a non-linear transformation of an input signal to generate a reference target signal. The reference target signal has a linear component associated with the linear transformation and a non-linear component associated with the non-linear transformation. The instructions 956, when executed, also cause the one or more processors to perform linear filtering of the input signal by controlling adaptation of the linear filtering to generate an output signal that substantially matches the linear component of the reference target signal.

The device 900 may include a wireless controller 940 coupled, via a transceiver 950, to an antenna 942.

The device 900 may include a display 928 coupled to a display controller 926. One or more speakers 936 and one or more microphones 946 may be coupled to the CODEC 934. In a particular aspect, the microphone 946 includes the microphone 212. The CODEC 934 may include a digital-to-analog converter (DAC) 902 and an analog-to-digital converter (ADC) 904. In a particular implementation, the CODEC 934 may receive analog signals from the microphone 946, convert the analog signals to digital signals using the analog-to-digital converter 904, and provide the digital signals to the processor 910. The processor 910 (e.g., a speech and music codec) may process the digital signals, and the digital signals may further be processed by the signal processing unit 120, the linearizer 130, or both. In a particular implementation, the processor 910 (e.g., the speech and music codec) may provide digital signals to the CODEC 934. The CODEC 934 may convert the digital signals to analog signals using the digital-to-analog converter 902 and may provide the analog signals to the speakers 936. The device 900 may include an input device 930. In a particular aspect, the input device 930 includes the image sensor 502 of FIG. 5.

In a particular implementation, the device 900 may be included in a system-in-package or system-on-chip device 922. In a particular implementation, the memory 952, the processor 906, the processor 910, the display controller 926, the CODEC 934, and the wireless controller 940 are included in a system-in-package or system-on-chip device 922. In a particular implementation, the input device 930 and a power supply 944 are coupled to the system-in-package or system-on-chip device 922. Moreover, in a particular implementation, as illustrated in FIG. 9, the display 928, the input device 930, the speaker 936, the microphone 946, the antenna 942, and the power supply 944 are external to the system-in-package or system-on-chip device 922. In a particular implementation, each of the display 928, the input device 930, the speaker 936, the microphone 946, the antenna 942, and the power supply 944 may be coupled to a component of the system-in-package or system-on-chip device 922, such as an interface or a controller.

The device 900 may include a portable electronic device, a car, a vehicle, a computing device, a communication device, an internet-of-things (IoT) device, a virtual reality (VR) device, a smart speaker, a speaker bar, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, or any combination thereof. In a particular aspect, the processor 906, the processor 910, or a combination thereof, are included in an integrated circuit.

In conjunction with the described implementations, an apparatus includes means for performing signal processing including a linear transformation and a non-linear transformation of an input signal to generate a reference target signal. For example, the means for performing the signal processing includes the processor 108, the neural network 124 of FIG. 1, the signal processing unit 120, the processor 906, the processor 910, one or more other circuits or components configured to perform signal processing including a linear transformation and a non-linear transformation of an input signal, or any combination thereof. The reference target signal 122 of FIG. 1 has a linear component associated with the linear transformation 126 and a non-linear component associated with the non-linear transformation 128, as described with reference to FIG. 1.

The apparatus also includes means for performing linear filtering of the input signal by controlling adaptation of the linear filtering to generate an output signal that substantially matches the linear component of the reference target signal. For example, the means for performing the linear filtering includes the processor 108, the linear filter 134, the filter adaptor 136 of FIG. 1, the linearizer 130, the processor 906, the processor 910, one or more other circuits or components configured to perform linear filtering of an input signal by controlling adaptation of the linear filtering to generate an output signal that substantially matches the linear component of the reference target signal, or any combination thereof Those of skill in the art would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A device to perform signal processing, the device comprising:
one or more processors configured to:
perform signal processing including a linear transformation and a non-linear transformation of an input signal to generate a reference target signal, the reference target signal having a linear component associated with the linear transformation and a non-linear component associated with the non-linear transformation;
determine whether an amount of non-linearity of the reference target signal satisfies a threshold; and
in response to a determination that the amount of non-linearity satisfies the threshold, perform linear filtering of the input signal to generate an output signal, wherein adaptation of the linear filtering is controlled based on both the linear component and the non-linear component of the reference target signal and causes the output signal to substantially match the linear component of the reference target signal and exclude the non-linear component of the reference target signal from the output signal.

2. The device of claim 1, wherein the one or more processors are configured to control the adaptation of the linear filtering by updating filter values to reduce a difference between the output signal and the reference target signal.

3. The device of claim 1, wherein the one or more processors are configured to control the adaptation of the linear filtering by updating filter values to minimize a difference between the output signal and the reference target signal.

4. The device of claim 1, wherein the one or more processors are configured to control the adaptation of the linear filtering by updating filter values with reference to the reference target signal so that the linear filtering of the input signal based on the filter values reduces a difference between the output signal and the reference target signal.

5. The device of claim 1, wherein the one or more processors are integrated into at least one of a mobile device, a mobile phone, a portable electronic device, a car, a vehicle, a computing device, a communication device, an internet-of-things (IoT) device, a virtual reality (VR) device, or an augmented reality (AR) device.

6. The device of claim 1, wherein the signal processing corresponds to signal enhancement.

7. The device of claim 1, wherein the input signal includes an audio signal, and wherein the signal processing corresponds to speech enhancement.

8. The device of claim 7, further comprising one or more microphones coupled to the one or more processors, the one or more processors configured to receive the audio signal from the one or more microphones.

9. The device of claim 1, wherein the input signal includes an audio signal, and wherein the signal processing corresponds to noise suppression, echo cancellation, dereverberation, or a combination thereof.

10. The device of claim 1, wherein the one or more processors are configured to use a neural network to perform the signal processing.

11. The device of claim 1, wherein the input signal includes a visual input signal, and wherein the signal processing corresponds to visual enhancement.

12. The device of claim 11, further comprising an image sensor coupled to the one or more processors, the one or more processors configured to receive the visual input signal from the image sensor.

13. The device of claim 1, wherein the one or more processors are included in an integrated circuit.

14. The device of claim 1, wherein the input signal includes an audio input signal, wherein the signal processing corresponds to speech enhancement, and wherein the one or more processors are further configured to process the output signal to generate a text output corresponding to speech in the audio input signal.

15. The device of claim 14, further comprising a display device coupled to the one or more processors, the display device configured to display the text output.

16. The device of claim 1, wherein the one or more processors are further configured to perform voice activity detection of the reference target signal, and wherein the adaptation of the linear filtering is controlled at least partially based on whether voice activity is detected.

17. The device of claim 1, wherein the input signal includes a visual input signal, wherein the signal processing corresponds to facial image enhancement, and wherein the one or more processors are further configured to process the output signal to generate a facial recognition output corresponding to one or more faces represented by the visual input signal.

18. The device of claim 17, further comprising an image sensor coupled to the one or more processors, the one or more processors configured to receive the visual input signal from the image sensor.

19. The device of claim 1, wherein the input signal includes an audio signal, and wherein the signal processing corresponds to noise suppression.

20. The device of claim 1, wherein the input signal includes an audio signal, and wherein the signal processing corresponds to echo cancellation.

21. The device of claim 1, wherein the input signal includes an audio signal, and wherein the signal processing corresponds to dereverberation.

22. A method of signal processing comprising:
performing signal processing including a linear transformation and a non-linear transformation of an input signal to generate a reference target signal, the reference target signal having a linear component associated with the linear transformation and a non-linear component associated with the non-linear transformation;

determining whether an amount of non-linearity of the reference target signal satisfies a threshold; and in response to a determination that the amount of non-linearity satisfies the threshold, performing linear filtering of the input signal to generate an output signal, wherein adaptation of the linear filtering is controlled based on both the linear component and the non-linear component of the reference target signal and causes the output signal to substantially match the linear component of the reference target signal and exclude the non-linear component of the reference target signal from the output signal.

23. The method of claim 22, wherein the signal processing corresponds to signal enhancement.

24. The method of claim 22, wherein the input signal includes an audio signal, and wherein the signal processing corresponds to speech enhancement.

25. The method of claim 22, further comprising using a neural network to perform the signal processing.

26. The method of claim 22, wherein the input signal includes a visual input signal, and wherein the signal processing corresponds to visual enhancement.

27. The method of claim 22, further comprising processing the output signal to generate a text output corresponding to speech in an audio input signal, wherein the input signal includes the audio input signal, and wherein the signal processing corresponds to speech enhancement.

28. The method of claim 22, further comprising performing voice activity detection of the reference target signal, wherein the adaptation of the linear filtering is controlled at least partially based on whether voice activity is detected.

29. The method of claim 22, further comprising processing the output signal to generate a facial recognition output corresponding to one or more faces represented by a visual input signal, wherein the input signal includes the visual input signal, and wherein the signal processing corresponds to facial image enhancement.

30. A non-transitory computer-readable storage device storing instructions that, when executed by one or more processors, cause the one or more processors to:

perform signal processing including a linear transformation and a non-linear transformation of an input signal to generate a reference target signal, the reference target signal having a linear component associated with the linear transformation and a non-linear component associated with the non-linear transformation;

determine whether an amount of non-linearity of the reference target signal satisfies a threshold; and in response to a determination that the amount of non-linearity satisfies the threshold, perform linear filtering of the input signal to generate an output signal, wherein adaptation of the linear filtering is controlled based on both the linear component and the non-linear component of the reference target signal and causes the output signal to substantially match the linear component of the reference target signal and exclude the non-linear component of the reference target signal from the output signal.

31. The non-transitory computer-readable storage device of claim 30, wherein the instructions, when executed by the one or more processors, further cause the one or more processors to perform voice activity detection of the reference target signal, and wherein the adaptation of the linear filtering is controlled at least partially based on whether voice activity is detected in the reference target signal.

32. An apparatus comprising:

means for performing signal processing including a linear transformation and a non-linear transformation of an input signal to generate a reference target signal, the reference target signal having a linear component associated with the linear transformation and a non-linear component associated with the non-linear transformation;

means for determining whether an amount of non-linearity of the reference target signal satisfies a threshold; and in response to a determination that the amount of non-linearity satisfies the threshold, means for performing linear filtering of the input signal to generate an output signal, wherein adaptation of the linear filtering is controlled based on both the linear component and the non-linear component of the reference target signal and causes the output signal to substantially match the linear component of the reference target signal and exclude the non-linear component of the reference target signal from the output signal.

33. The apparatus of claim 32, wherein the means for performing signal processing, the means for determining, and the means for performing linear filtering are integrated into at least one of a mobile device, a mobile phone, a portable electronic device, a car, a vehicle, a computing device, a communication device, an internet-of-things (IoT) device, a virtual reality (VR) device, or an augmented reality (AR) device.

* * * * *